United States Patent [19]

Erickson et al.

[11] 4,267,049
[45] * May 12, 1981

[54] BIOLOGICAL SLUDGE-ENERGY RECYCLING METHOD

[76] Inventors: Lennart G. Erickson, 1070 E. Meadow Cir., Palo Alto, Calif. 94303; Howard E. Worne, Lyon Industrial Pk., Route 73, Berlin, N.J. 08009

[*] Notice: The portion of the term of this patent subsequent to Jul. 3, 1996, has been disclaimed.

[21] Appl. No.: 52,644

[22] Filed: Jun. 27, 1979

Related U.S. Application Data

[63] Continuation-in-part of Ser. No. 877,195, Feb. 13, 1978, Pat. No. 4,159,944.

[51] Int. Cl.³ .............................................. C02F 3/34
[52] U.S. Cl. ................................. 210/606; 210/609; 210/613; 210/631; 210/632; 210/912
[58] Field of Search ....................................... 210/2–12, 210/15, 18, 38 B, 51, 54, 57–59, 65–67, 73 S, 74; 426/59, 52, 53, 54; 435/253, 804; 71/12–14

[56] References Cited

U.S. PATENT DOCUMENTS

| 3,801,499 | 4/1974 | Luck | 210/11 |
| 3,994,780 | 11/1976 | Klass et al. | 210/11 |
| 4,041,182 | 8/1977 | Erickson et al. | 435/804 |
| 4,083,783 | 4/1978 | Wing et al. | 210/54 R |
| 4,159,944 | 7/1979 | Erickson et al. | 210/18 |

FOREIGN PATENT DOCUMENTS

50-20559  3/1975  Japan .......................................... 210/51

*Primary Examiner*—Benoit Castel
*Attorney, Agent, or Firm*—Townsend and Townsend

[57] ABSTRACT

A method is described for converting treated sludge into an improved concentrated organic feedstock. The method includes conditioning of sludge with hydrolytic enzymes, the mechanical disintegration of tissue and cell components, the removal of heavy metals, autolysis and dewatering to produce an organic fertilizer or feedstock. Product stabilization for long-term storage is achieved by acidification or addition of granular sorbents. Agricultural fertilizers are produced from input raw material such as sludge from municipal waste-water treatment facilities or sludge from biological processing of other organic wastes. Animal feed protein concentrates are produced from cultured cellular biomass sludge inputs. The separated heavy metals fraction may be refined to recover individual minerals. Energy usually expended for disposal of sludge as wastes may be applied to recycling such sludge into useful products of this invention. The commercial equivalents of these products usually are manufactured from petrochemical and other primary energy resources.

31 Claims, 1 Drawing Figure

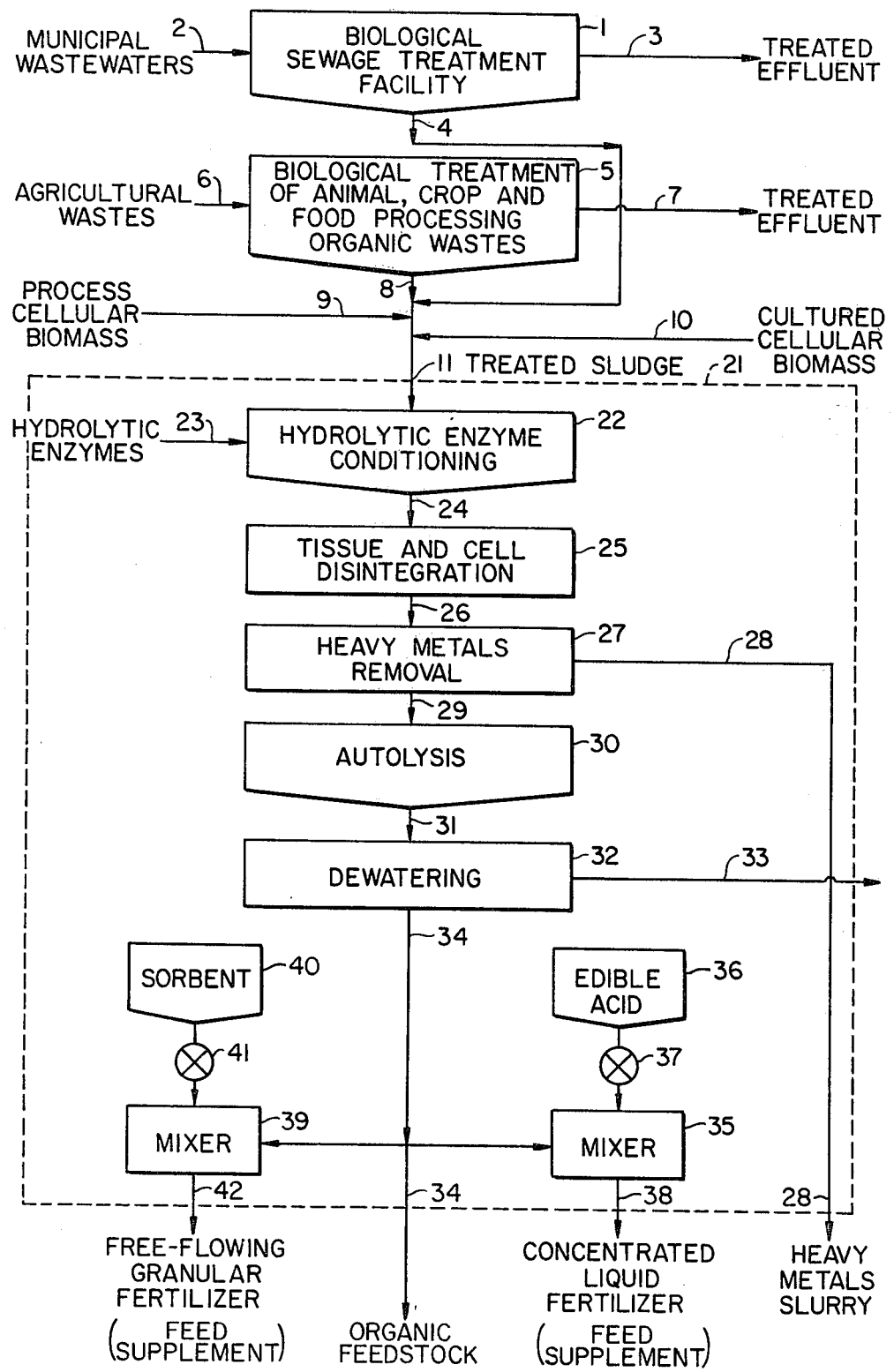

BIOLOGICAL SLUDGE-ENERGY RECYCLING METHOD

RELATED APPLICATIONS

This application is a continuation-in-part application of our copending patent application entitled WASTEWATER ENERGY RECYCLING METHOD bearing Ser. No. 877,195 and filed on Feb. 13, 1978, now U.S. Pat. No. 4,159,944.

BACKGROUND OF THE INVENTION

"The Federal Water Pollution Control Amendments of 1972" (PL92-500) and other Federal public laws and regulations reflect the national objectives and public interest in reducing the environmental pollution incident to the disposal of municipal and agricultural wastes.

An excellent review in regard to municipal wastewaters is the paper "Land Disposal—What's the Realistic View", by authors H. L. Michel, P. H. Gilbert and H. K Creed, published in *Water and Wastes Engineering*, June, 1974. This refers to a comprehensive study program completed for the U.S. Army Corps of Engineers by PBQ&D, Inc., Engineers, including an analysis of characteristics of wastewaters and sludges produced in the San Francisco Metropolitan Bay Area.

The opportunities and limitations regarding agricultural uses of sewage sludge are summarized in two reports published by the Council for Agricultural Science and Technology (CAST), Iowa State University, Ames, Iowa: "Utilization of Animal Manures and Sewage Sludges in Food and Fibre Production", Report 41, February, 1975, and "Application of Sewage Sludge to Croplands: Appraisal of Potential Hazards of the Heavy Metals to Plants and Animals", Report 64, November, 1976.

The potential for recovery of raw materials, now usually discarded as treated sludge, from conventional activated sludge sewage treatment facilitites is evident in the data published. Expressed in volumes per 100,000 persons, the dryweight solids content of treated sludges ranges from 8 to 17 tons per day containing about 1.15% to 6.0% of nitrogen in forms suitable for use as agricultural fertilizer. The nitrogen content is of special interest because natural gas is the principal resource used in commercial nitrogen fertilizers. For instance, about 40,000 cubic feet of natural gas are required to manufacture one ton of fertilizer nitrogen, according to Commercial Fertilizers, May, 1975, published by the Statistical reporting Service of the U.S. Department of Agriculture.

The PGQ&D, Inc., and CAST studies referred to above also provide data on the substantial amounts of heavy metals in treated sewage sludges. In terms of concentration in milligrams per kilogram of dry solids, the following concentrations are noted:

| Element | Range mg/kg = parts per million |
|---|---|
| Zinc | 500 to 50,000 |
| Copper | 250 to 17,000 |
| Nickel | 25 to 8,000 |
| Cadmium | 5 to 2,000 |

The potentials for resource recovery and recycling of metal values is of special interest. U.S. Geological Survey Circular 784 (1978) describes a special situation in which gold and silver are present in sewage sludge and incinerator ash in quantities providing incentives for special treatment to recover precious metals. The presence of these toxic metals is a major limitation to the use of wastewaters, treated sludge, or treated effluent for any agricultural purpose.

Land disposal of treated sewage sludge is currently practiced but is costly since the material is difficult to dewater due to its predominately cellular content. The potentials for heavy metals pollution of land and ground water require sometimes costly mitigating measures.

Uses of treated sewage sludge as agricultural fertilizer are limited to occasional applications, as repetitive use results in an accumulation of toxic heavy metals in the soil, particularly cadmium. Incineration is difficult because of water content and costly due to supplemental heat usually required to support combustion. Discharge of sludge into public waterways and the oceans is not an acceptable alternative in the opinion of many environmental experts.

According to published reports, substantial use of ensiled, composted or digested sludge from animal manure as an animal feed additive is now being practiced in the U.S.A., and the use of sewage sludge for animal feed supplementation is being tested. A report entitled, "Multielement Analysis of Animal Feed, Animal Wastes, and Sewage Sludge" by Stephan G. Capar et al. of the Division of Chemistry and Physics, U.S. Food and Drug Administration, Washington, D.C. 20204 (July, 1978), calls attention to the potentials for toxic heavy metals buildup in sludge fed to agricultural animals, particularly in multiple-pass repetitive recycling through beef cattle in close confinement feeding installations. The reference papers indicate that heavy metals are methodically concentrated in human and animal wastes at levels up to above five times the content in food and feed consumed. Biological treatment improves the feed palatability and nutrition content of such wastes; however, all such processing results in conversion of some of the organic material into gaseous form with resulting further increases in the relative content of toxic heavy metals in the remaining sludge product.

In our above referenced copending patent application, there is described an improved method for conditioning sewage wastewaters into agricultural irrigation water containing most of the influent organic materials processed into fertilizer and soil amendment materials in suspension or solution. This method is best suited for use in semiarid areas with temperate climates and long growing seasons where agricultural lands are within range of feasible distribution.

In cold weather areas where freezing conditions preclude irrigation for extended periods, and in situations where suitable agricultural lands are not situated within economic pumping distances from the urban area source of wastewater, conventional biological treatment usually is employed to produce a relatively non-polluting effluent suitable for discharge to waterways and a treated sludge residue often disposed of as waste. Usually such waste disposal involves substantial cost to reduce environmental pollution.

SUMMARY OF THE INVENTION

This invention relates to an improved method for processing treated organic sludges into a concentrated detoxified colloidal organic feedstock or fertilizer product and a refinable heavy metals concentrate product.

Broadly speaking, the present invention provides a method for converting treated sludge, as hereinafter defined, into useful products and it contemplates the hydrolyzation of organic substances in the sludge. A major proportion and normally substantially all of the cells in the sludge are disintegrated into organic particles to thereby form a colloidal slurry which is thereafter separated into an effluent and a moist product including the organic particles which is well suited for its relatively rapid metabolism by living organisms. By treating the sludge in the indicated manner, the slurry is readily dewatered and the moisture content of the final product can be significantly reduced over what was heretofore feasible.

More specifically, the present invention contemplates to normally hydrolyze the organic cells, as well as other substances in the sludge, in a dual step. The incoming treated sludge is initially hydrolyzed by adding thereto hydrolytic enzymes to make the organic cells more susceptible to rupture. After the cells have been ruptured, the colloidal slurry is subjected to autolysis by holding the slurry and permitting the previously added hydrolytic enzymes together with endocellular enzymes released into the slurry as the cells are ruptured to act on the cell particles, gels, etc. present in the slurry. After the autolysis there remains a microparticulate slurry which is readily dewatered.

In addition, the present invention contemplates to remove from the colloidal slurry heavy metal ions and salts by means of a chelating process so as to substantially eliminate heavy metals from the final product.

Therefore, a method performed in accordance with the present invention involves the steps of adding to treated sludge hydrolytic enzymes and holding the sludge and the added enzymes for a sufficient length of time to at least partially hydrolyze the walls of the cells and any polysaccharide slime coating present on the cells. Thereafter the cells are ruptured, typically mechanically to form a colloidal slurry including ruptured cell particles, polysaccharide gel and other substances and to thereby release into the colloidal slurry endocellular enzymes present in the cells. If the treated sludge includes heavy metal traces, the slurry is contacted with a metal chelating substrate to remove the heavy metals therefrom. The organic substances in the colloidal slurry are further autolyzed by holding the slurry in a tank for a sufficient length of time to hydrolyze the organic particles, the gel and the like to thereby form a microparticulate slurry. The microparticulate slurry is then dewatered and a moist product including the cell particles is collected and stored. To prevent the subsequent decomposition of the product, microbial and pathogenic activity in the product being stored is inhibited by appropriately acidifying the product or adding a granular sorbent material thereto. The product can then be used as a readily metabolizable substance, e.g. as a fertilizer or as a feed supplement.

In the above summarized manner, agricultural fertilizers as granular or liquid concentrate products are produced from such input raw materials as treated sludge from municipal wastewater treatment facilities or sludge residues from biological processing of organic wastes. Our above referenced, copending U.S. patent application describes an alternative method for processing wastewater treatment sludge and effluent into irrigation grade water combined with colloidal organic fertilizer in solution and suspension.

Animal feed protein concentrate products are produced from such input material as a cultured cellular biomass from biological processing of organic raw materials. Particularly useful for such purpose is the single cell bioprotein product described in our U.S.A. Pat. No. 4,041,182 dated Aug. 9, 1977, and entitled *BIO-PROTEIN FEED MANUFACTURING METHOD*.

Sludges from treatment of municipal wastewaters typically contain substantial amounts of heavy metals. The separated heavy metals product of this invention may be refined to recover such mineral resource values as cadmium, copper, nickel, zinc, and, in special situations, precious metals such as gold and silver.

Therefore, a major objective of the present invention is to provide methodology for recycling treated sludges to recover the potential raw material values therein in the form of useful commercial products.

A further major object of this invention is to conserve and recycle energy, equivalent to the energy that would otherwise be required for production and delivery of the corresponding volumes of fertilizer, feed, soil amendment materials and heavy metals, comprising the products produced by the method and process of our invention.

Other major objects of this invention are to reduce the environmental damage inherent in current practices of disposal of conventionally treated sludges by landfill, sea dumping, incineration and other methods of disposal and to conserve the energy and other resources now expended in the processes of such disposal.

An object of this invention is to destroy the cell structure and viability of microorganisms often present in treated sludges including bacteria, fungi, algae, protozoa, rotifers, eggs, worms, seeds, and other biological and plant life forms.

An object of this invention is to provide means for efficiently disintegrating the structure of cellular components of treated sludge thus to facilitate efficient sterilization with relatively reduced requirements for chemical and other sterilization agents.

An object of this invention is to provide means for efficiently disintegrating the structure of cellular components of treated sludge thus to facilitate efficient dewatering to relatively low water content.

An object of this invention is to provide improved fertilizer products in which the structure of cellular components has been disintegrated, thus making available to soil microorganisms and plant life the readily utilizable cellular protoplasm contents including nucleotides, phytohormones and ancillary nutrients.

An object of this invention is to provide an improved feed supplement for animal nutrition in which the structure of the cellular components has been disintegrated, thus making available to digestive process the readily utilizable cellular protoplasm contents including nucleotides, phytohormones, enzymes, and ancillary nutrients.

An object of this invention is to provide for effective and economical processing of treated sewage sludge to remove heavy metal ions or salts.

An object of this invention is to refine and recycle, as useful by-products, the heavy metals separated from treated sludge.

For purposes of this patent application, the following terms used herein are meant to have the meaning indicated below.

The term "Municipal Wastewaters" refers primarily to the raw sewage wastewater acceptable as influent to conventional sewage treatment facilities.

The term "Agricultural Wastes" refers primarily to agricultural animal wastes and residues from fruit, vegetable and animal packing operations. Also included are fieldcrop residues and trees, grasses, algae, and water plants specifically cultivated to produce biomass raw materials for biological processing into various products.

The term "Biological Treatment" refers to all known methods of treatment of organic materials in sewage wastewaters and any aqueous slurry of biodegradable organic materials wherein microbial reactions are used to purify the wastewater stream by reduction of biodegradable and putrefactive components to a relatively stable separated treated sludge residue. Typically well-known activated sludge aerobic treatment and anaerobic digestion systems are used to process sewage wastewaters. The term also includes such industrial processes as digester treatments of organic matter to produce methane gas as a "Process Cellular Biomass" sludge residue and also processes for production of animal feeds including a substantial content of cellular biomass protein as "Cultured Cellular Biomass."

The term "Treated Sludge" refers to the residue sludge, containing most of the solids, removed from wastewaters and slurries of organic materials in all known conventional biological treatment methods. Typically such treated sludge contains a relatively stable cellular biomass of intact cells retaining water and metabolized minerals. Typically, sludges from treatment of municipal sludge wastewaters contain a residue of heavy metals within the cells, or occluded on or in the polysaccharide slime coating adhering to the exterior of the cells walls. Typically such treated sludge has a water content of 85 to 97%, and the heavy metals content is higher relative to other solids (dryweight basis) than the content of untreated wastewaters.

The term "Heavy Metals" relates to metals having a specific gravity of 5.0 or more and to metallic ions and salts of such metals.

BRIEF DESCRIPTION OF THE DRAWING

The drawing is a flow diagram which illustrates the process of the present invention.

DESCRIPTION OF THE PREFERRED EMBODIMENT OF THE INVENTION

Referring to the drawing, there is indicated at 1 schematically and all inclusively, all known biological treatment methods, including activated sludge treatment, for reducing raw municipal wastewaters 2 into fractions including a treated effluent 3 and treated sludge 4. Also indicated at 5, all inclusively, are all known biological treatment methods for reducing raw agricultural wastes 6 from animals and crops into fractions including a treated effluent 7 and treated sludge 8.

Process cellular biomass sludge residue from agricultural or industrial biological processing of organic raw materials may be added at 9 as forms of treated sludge for further processing according to the method of our invention.

Cultured cellular biomass products from biochemical processing of slurried organic materials may be added at 10 as a special form of treated sludge well suited to production of animal feed products of this invention.

The source, or combination of sources, of treated sludge combined at 11 is accepted as input raw material into processing according to the method of our invention, indicated schematically within dotted line area 21.

The treated sludge inflow 11 is preferably discharged into a hydrolytic enzyme conditioning reactor 22 as an aqueous slurry. An inoculum of hydrolytic enzymes is added at 23.

The primary purpose of this enzymatic reaction is to hydrolyze the polysaccharide slime coating constituting the outer layer of cellular and other components of the treated sludge, to release to solution heavy metal ions occluded thereon, and to attack and soften the cellulosic wall structure of the cells; the sludge is thus conditioned for a more efficient and economical processing in the subsequent tissue and cell disintegration step described below. We have found that the most toxic metals such as nickel, cadmium, lead, gold and silver will be partly metabolized by the cells and partly occluded on or in the cell polysaccharide coating. Other metals such as zinc and manganese are more readily metabolized.

The conditioned sludge discharged at 24 flows through a tissue and cell disintegration process 25 having the capacity to destroy the particulate structure of organic solids in the sludge by such thorough dispersing action that all parts are made to correspond in structure. Suitable machines are well-known in the art and are employed in the chemical industries for the dispersal of solids in fluid solutions and for the preparation of emulsions.

Disintegration of the tissue and cell structure of materials flowing through process 25 results in destroying the viability of practically all biological life forms present in the treated sludge inflow at 11 including bacteria, fungi, algae, protozoa, rotifers and also eggs, worms and seeds. Heavy metal ions metabolized by the cells are also released to solution.

This colloidal slurry discharged from 25 is subjected to a heavy metals separation process at 27, preferably employing a chelation reaction, well-known in the art, to remove from the input slurry 26 most of the content of heavy metals. Such chelation treatment is effective at relatively low cost in the practice of our invention due to the prior disintegration of cellular components and the reduction of solids to colloidal particulate size, thus releasing to chelation reaction a proportion of the heavy metals metabolized by the cells which otherwise would be shielded within the relatively impervious cellular walls.

The separated heavy metals slurry discharged at 28 is a potentially valuable product produced according to the method of this invention.

The demineralized colloidal slurry discharged at 29 flows into an autolysis reaction tank 30. Components of this inflow include a carry-through of hydrolytic enzymes 23 remaining after the enzyme conditioning reaction 22 plus an infusion of fresh endocellular enzymes released to solution as a result of the tissue and cell disintegration process 25. These enzymes react with and hydrolyze the polysaccharide structure of cellular protoplasm material released to solution in tissue and cell disintegration process 25.

The autolysate slurry product 31 of our invention discharged from autolysis tank 30 is uniquely adapted to efficient dewatering at 32 because all solids are in microparticulate form released from agglomerate, cellular or polysaccharide forms of structure which otherwise would bind or retain water. Well-known dewatering devices and technology may be used to separate solids from the water contents, including centrifuge, vacuum screen or reverse osmosis filtration machines. This unique conditioning to facilitate dewatering is an important feature of the method of our invention. The filtered effluent removed at 33 may be combined for discharge with treated effluents 3 or 7.

The dewatered product 34 of our invention is biologically reactive but may be used in this form, preferably within 24 hours, as an organic feedstock raw material for biochemical processing to other products or may be used locally as a high quality fertilizer for agricultural use.

For longer term storage, the organic feedstock product 34 is combined in a mixer 35 with suitable edible acids added from tank 36 via a valve 37 as necessary to acidify the concentrated liquid fertilizer slurry to a pH range of 3 to $3\frac{1}{2}$. This is sufficient to inhibit microbial or pathogenic activity during storage and transport of the concentrated liquid fertilizer product 38 to a point of use. Suitable edible acids are Acetic Acid, Lactic Acid, Citric Acid, Phosphoric Acid or Proprionic Acid.

Alternatively the concentrated product 34 may be combined in a mixer 39 with a suitable granular sorbent material added from tank 40 via a valve 41. Mixed to about 25% total moisture content by weight, the liquid is absorbed or adsorbed by the sorbent material effectively inhibiting any bacteria or pathogens by denial of moisture to these microorganisms during storage and transport to a point of use. Suitable sorbent granular materials are diatomaceous earth products available under the trade designations Celatom or Flow Dry-85 from Eagle-Picher Industries, Inc., or Celite products available from Johns-Manville Corporation. A suitable aluminosilicate "Molecular Sieve" product is available from Union Carbide Corporation. Useful sorbent material also may be produced from agricultural residues, for instance, corncobs ground to the desired particulate size and dehydrated. Alternatively well-known drying techniques may be used to reduce the moisture content; however, the temperature should not exceed about 40° C. for conservation of the biological potency of the product of our invention.

The hydrolytic enzyme treatment at 22 can be accomplished best in an aqueous slurry, preferably having a 3% to 5% solids content (dryweight basis), buffered to a pH value in the range 6.5 to 7.2, preferably 7.0, and at a temperature range of between 16°–40° C. and preferably at a temperature of about 37° C. The slurry can be recirculated as necessary to keep solids in suspension and accessible to enzymatic reaction. Average time required for the hydrolytic enzyme conditioning reaction is in the range of between 60 to 120 minutes, and treatment facilities can be designed for either batch or flow-through processing.

The hydrolytic enzymes added at 23 can be supplied as an aqueous solution of dehydrated non-specific enzymes prepared as a crude mixture separated from bacterial fermentation broths and subsequently dehydrated. Potency is equal to 50,000 International Units of activity per gram as supplied by Bioferm International, Inc., Moorestown, New Jersey. The dried enzymes may be rehydrated in a ratio of 1 pound to five gallons of water, at 37° C., and added to reactor 22 in the ratio of 1 pound of dehydrated enzymes per 1000 pounds (dryweight) of biodegradable organic material inflow in the treated sludge 11. For a typical slurry concentration of 4% solids, about 1.5 pounds of dehydrated enzymes are required per 10,000 gallons.

Hydrolytic enzymes useful for the purposes of this invention includes:
Carboxylic Ester Hydrolases
Thiolester Hydrolases
Phosphoric Monoester Hydrolases
Phosphoric Diester Hydrolases
Triphosphoric Monoester Hydrolases
Sulphuric Ester Hydrolases
Diphosphoric Monoester Hydrolases
O-Glycosyl Hydrolases
N-Glycosyl Hydrolases
S-Glycosyl Hydrolases
Thioether Hydrolases
Ester Hydrolases
α-Aminoacylpeptide Hydrolases
Peptidylamino acid Hydrolases
Dipeptide Hydrolases
Dipeptidylpeptide Hydrolases
Peptidyldipeptide Hydrolases
Serine Proteinases
SH Proteinases
Acid Proteinases
Metallo Proteinases
Linear Amide Hydrolases
Cyclic Amide Hydrolases
Linear Amidine Hydrolases
Cyclic Amidine Hydrolases
Nitrile Hydrolases
Acid Anhydride Hydrolases
Sulphonyl Anhydride Hydrolases
Carbon-Carbon Hydrolases
Organic Halide Hydrolases For large volume installations, a concentrate of dehydrated, viable, hydrolytic enzyme-producing microorganisms may be employed. Potency is about 5 billion viable microorganisms per gram as supplied by Bioferm International, Inc., Moorestown, N.J. Each pound of this inoculant may be cultured in 50 gallons of water, at about 37° C., to which is added 5% to 7% by volume of beet or cane molasses, or an equivalent source of sugar and minerals, and sufficient urea or an equivalent source of nitrogen to establish approximately a ten-to-one carbon to nitrogen ratio. The pH value is adjusted to the 6.8/7.2 range, optimum is 7.0, and air is diffused into the recirculating slurry at the rate of about 130 cfm per 1000 gallons. In about 18-24 hours, the finished liquid culture will have a concentration of about 1 billion microorganisms per milliliter and it may be added at 23 into reactor 22 at the rate of 5% by volume or 50 gallons per 1000 gallons of treated sludge slurry. Such cultures should be used within 12 hours of preparation. Ten percent of each batch may be used as the inoculant for subsequent culture batches up to a total of about six such extension cultures, after which a new series of cultures should be started with a fresh supply of dehydrated microorganisms as the inoculant.

Enzyme-producing microorganisms useful for the purposes of this invention include:

| | | |
|---|---|---|
| Alternaria sp. | Bacillus sp. | Acremonium sp. |
| Arthrobotrys sp. | Achromobacter sp. | Memnoniella sp. |
| Botrytis sp. | Arthrobacter sp. | Monascus sp. |
| Cephalosporium sp. | Corynebacterium sp. | Mucor sp. |
| Chaetomium sp. | Cellulomonas sp. | Mortierella sp. |
| Chloridium sp. | Micrococcus sp. | Myrothecium sp. |

| -continued | | |
|---|---|---|
| Chrysosporium sp. | Streptomyces sp. | Paecilomyces sp. |
| Cladosporium sp. | Desulphovibrio sp. | Penicillium sp. |
| Conidiobolus sp. | Micromonospora sp. | Polyporus sp. |
| Endothia sp. | Pseudomonas sp. | Preussia sp. |
| Entomophthora sp. | Nocardia sp. | Pythium sp. |
| Eupenicillium sp. | Mycobacterium sp. | Rhizopus sp. |
| Fomes sp. | Thermoactinomyces sp. | Sporoboromyces sp. |
| Fusarium sp. | Thermomonospora sp. | Stachybotrys sp. |
| Gliocladium sp. | Thermopolyspora sp. | Trichoderma sp. |
| Gliomastix sp. | Xanthomonas sp. | Verticillum sp. |
| Humicola sp. | Aspergillus sp. | |

The cell disintegration process may be accomplished efficiently by conventional means, following the enzyme-conditioning process 22 of our invention. Suitable means include the Ultra-Turax Dispersers for batch treatment or the Dispax-Reactor in-line dispersing machines available from the Teckmar Company, Cincinnati, Ohio. These machines employ high speed rotor-stator generators to create pressure, shear and pressure release forces to disintegrate cells and other solids in the input conditioned sludge 24. Other suitable machines are the models M and MC Industrial Homogenizers available from Gaulin Corporation, Everett, Massachusetts, which use pressurization to about 8,000–10,000 psi to force the material through a restricted area orifice creating shear, impact and sudden pressure release forces to disintegrate the cells, tissue and other solids. Alternative disintegration technologies may be used such as the use of ultrasonic wave energy in slurry solutions.

The heavy metals removal process 27 is efficiently accomplished as a result of the tissue and cell disintegration process 25 of our invention in combination with our hydrolytic enzyme-conditioning step 22. A suitable metals removal method is described by Wing et al. in U.S. Pat. No. 3,979,286. This method employs the chelating capacity of insoluble cross-linked starch xanthates to remove heavy metals in an aqueous solution by flow-through contact adsorption. Suitable insoluble cross-linked starch xanthate material is available in coarse granular or prill form from Bioferm International, Moorestown, N.J. The pH value of process inflow 26 should be buffered to the 6.8–8.5 range, preferably 8.0, from maximum heavy metals removal efficiency.

In the practice of chelation-processing, the retained accumulated metallic ions can be released, and the chelate material regenerated by occasional backwashing with a dilute acid solution. The metals may be separated from the acid solution by exchange resin bed technology and discharged as a waterbase slurry containing the heavy metal salts in solution and suspension. This slurry may be further processed and refined for the recovery of individual metal values. Such techniques are well known in the art.

EXAMPLE

A 5-gallon sample of treated sludge was obtained from the sewage wastewater treatment facility at Berlin, N.J., and was processed according to the method of our invention. Hydrolytic enzyme-conditioning was accomplished in 90 minutes by addition of an enzyme solution, prepared as described above, to a slurry having a 4% solids content, an adjusted pH 7.0 and a temperature of 37° C. Tissue and cell disintegration were accomplished within three minutes using a Techmar Super Dispax SD 65 Disperser. The resultant colloidal slurry was processed for removal of heavy metals in an improved chelation process adopted from that described by Wing et al. in U.S. Pat. No. 3,979,286. The results of spectrographic testing for some heavy metals in the treated sludge 11 as compared to the resultant demineralized slurry 29 were tabulated: (dryweight basis)

| Element | Treated Sludge 11 | Demineralized Sludge 29 | % Removal |
|---|---|---|---|
| Iron | 16,400 mg/kg | 853 mg/kg | 94.8% |
| Copper | 2,900 mg/kg | 841 mg/kg | 71.0% |
| Chromium | 3,100 mg/kg | 294 mg/kg | 90.5% |
| Lead | 1,900 mg/kg | 342 mg/kg | 82.0% |
| Nickel | 6,600 mg/kg | 944 mg/kg | 85.7% |
| Tin | 3,400 mg/kg | 299 mg/kg | 91.2% |
| Molybdenum | 70 mg/kg | 10.99 mg/kg | 84.3% |
| Vanadium | 720 mg/kg | 69.84 mg/kg | 90.3% |

An alternative process for removing heavy metal ions in aqueous solutions is described by Joshiaki Kajyama in U.S. Pat. No. 3,890,225, wherein absorption by coral fossil limestone in granular form is employed. As in the case with the Wing et al. process, and in all other ion removal processes known to us, such processing is not effective for the removal of the heavy metal ions contained within the cellular wall structure comprising much of the biomas of treated sludges. In the improved process and method of our invention, such metal ions are effectively separated by chelation treatment because the prior hydrolytic enzyme-conditioning step 22 and the tissue and cell disintegration step 25 serve to release the cellular contents to solution, thus making the metal ion content readily accessible to removal processing in our step 27. Other alternative processing methods for heavy ion removal may be employed without departing from the scope of the process and method of our invention.

The autolysis reaction step 30 can be accomplished most efficiently by buffering the pH value to the range of 6.5 to 7.6, preferably 7.0, and by maintaining the temperature in the range of 16°–40° C., preferably 37° C. Average time for the autolysis enzyme conditioning reaction is 6 to 12 hours, and treatment facilities can be designed for either batch or flow-through processing. The autolysis reaction effectively hydrolyzes the protoplasm, nucleoprotein and lipoprotein components of the cells through action of the nucleosidase and nucleotidase and other endocellular enzymes released in tissue and cell disintegration step 25. This reaction is also assisted by a carry-through of hydrolytic enzymes 23 which have an effective life of up to 20 hours. These reactions are also effective in hydrolyzing any cells that may have escaped disintegration in step 25, including any pathogenic bacteria.

The microparticulate slurry 31 can now be efficiently and effectively dewatered, as the water content trapped within the tissue and cellular components of treated sludge 11 has been released to solution. Reverse osmosis filtration technology, well-known in the art, may be used for dewatering; and suitable equipment is available from Amicon Corporation, Cambridge, Mass. Alternatively, centrifuge, vacuum screen or other filtration machines may be used. Flocculating agents may be added, as is well known in the art, to facilitate agglomeration and separation of fine particulate matter. The filtered effluent removed at 33 may be combined with and discharged with treated effluents 3 or 7. This unique conditioning to facilitate dewatering is an important feature of the method of our invention.

Most of the total nitrogen content of the inflow of treated sludge 11 is incorporated by the process and method of our invention into an important component of our organic feedstock product 34. The cellular protoplasm content for ruptured cells is particularly valuable as a potent and readily available nutrient for soil microorganisms, plants and animals. The nitrogen component of this protoplasm is in the form of readily assimilated proteinaceous nitrogen.

Since our heavy metals removal step 27 is most effective for removing the heavier metal ions, there are present in our discharged product 34 other minerals of relatively lower specific gravity and which are of value for agricultural purposes. These include phosphorous, potassium and trace minerals in readily utilized form as a result of prior aerobic metabolization inherent in the various biological treatments which produce the treated sludge 11 inflow to the method and process of our invention.

All solid materials in the organic feedstock product 34 of our invention are in microparticulate form with particulate size typically about 0.5 micron. Such processing conditions the nutrients for relatively rapid uptake by soil microorganisms and plants, as contrasted with the more extended period required for bio-degrading the cellular components of manures and organic wastes incorporated into soils as fertilizers. Such microparticulate processing also conditions the nutrients for rapid metabolization when organic feedstock 34 is used as an animal feed.

The products of this invention are useful as potent agricultural fertilizers when the input raw material stream is municipal wastewater 2 or agricultural waste 6 or process cellular biomass 9. The concentrated liquid fertilizer product 38 of this invention may be marketed in suitable containers such as plastic or metal drums or it may be transported in bulk in tank cars or in trucks. The free-flowing granular fertilizer product 42 of this invention may be marketed in vaporproof bags or other suitable containers which will prevent moisture absorption prior to use. The sorbent carrier is useful for improvement of soil tilth and waterholding capacity.

When the treated sludge inflow 11 is cultured cellular biomass 10 the resultant protein concentrate products 38 and 42 are relatively free of extraneous material and are best suited for use as animal food supplements. For this application, only edible grade acid or sorbent materials are used. Alternatively, the organic feedstock product 34 may be further treated to inactivate microorganisms; for instance, flash pasteurization or ozone treatment may be used. Relatively little treatment is needed as most pathogenic microorganisms have been destroyed by the tissue and cell disintegration process 25, hydrolytic enzyme-conditioning step 22 and autolysis step 30. Furthermore, the particulate size has been substantially reduced by such processing and so can be more efficiently sterilized.

Certain alternative arrangements in the sequence of the steps of the method and process of our invention will be apparent to those skilled in the art. For instance, the hydrolytic enzyme conditioning step 22 may be omitted if more powerful or effective machines or other technology is employed to accomplish the desired degree of tissue and cell disintegration in step 25. Similarly, the autolysis step 30 can be deleted under certain circumstances if a relatively higher moisture content in the end product is acceptable or if more efficient dewatering machinery should become available. Further, the autolysis step 30 may be employed following tissue and cell disintegration step 25 and preceding heavy metals removal step 27, and the heavy metals removal step 27 may be omitted if the cultured cellular biomass feed 11 is prepared from organic raw materials which do not contain heavy metals at undesirable levels. Such alternative arrangements are considered to be within the scope of our invention.

We believe that the total costs of the auxiliary process and method of our invention will be in substantial part offset by the alternative costs of processing and disposal of sewage sludges in locations subject to increasingly stringent regulations, and that the values added by the method and process of our invention will substantially exceed the cost of processing in terms of both monetary and energy equivalents. We believe too that the practice and use of our invention will accomplish a major reduction in environmental damage resulting from disposal of sewage sludge and residues by landfill and by dumping in the oceans.

Although the foregoing improved method for our Wastewater Sludge-Energy Recycling Method has been described in some detail by way of illustration and example for purposes of clarity and understanding, it is to be understood that certain changes, modifications and omissions may be practiced within the spirit of the invention as limited only by the scope of the appended claims.

We claim:

1. A method for converting treated sludge into useful substances, the method comprising the steps of: hydrolyzing organic materials present in the sludge by adding to the sludge at least one of hydrolytic enzymes and hydrolytic enzyme producing microorganisms; thereafter disintegrating organic cells present in the sludge into organic particles to thereby form a colloidal slurry including the particles; holding at least one of the sludge, including the enzymes or the microorganisms, and the slurry, including the particles; and thereafter separating the slurry into an effluent and a moist product including the organic particles and adapted for a relatively rapid metabolization by living organisms.

2. A method according to claim 1 wherein the step of holding comprises holding the slurry after the step of disintegrating so that the hydrolytic enzymes in the slurry and endocellular enzymes released into the slurry by the organic cells during the step of disintegrating further hydrolyze the particles.

3. A method according to claim 2 wherein the step of holding the slurry is carried out for no more than about 12 hours.

4. A method according to claim 3 wherein the step of holding the slurry is carried out for at least about six hours.

5. A method according to claim 3 including the step of maintaining the temperature of the slurry during the holding step in the range of between about 16° C. to about 40° C.

6. A method according to claim 1 wherein the step of holding comprises holding the sludge for no more than about two hours after the step of adding and prior to the step of disintegrating the cells.

7. A method according to claim 6 including the step of maintaining the temperature of the sludge during the holding step at between about 16° C. to about 40° C.

8. A method according to claim 7 wherein the temperature is held at about 37° C.

9. A method according to claim 6 wherein the step of holding the sludge is carried out for between about one to about two hours.

10. A method according to claim 1 including the step of adding to the product an edible acid in an amount sufficient to inhibit microbial and pathogenic activity during storage and transport of the product.

11. A method according to claim 10 including the step of utilizing the acidified product as a fertilizer.

12. A method according to claim 10 including the step of utilizing the acidified product as a feed supplement.

13. A method according to claim 1 including the step of adding to the product a sufficient amount of a sorbent material to reduce the moisture content of the product to a level at which bacteria and pathogens are prevented from being further hydrolyzed by enzymes present in the product.

14. A method according to claim 13 including the step of using the product including the sorbent material as a fertilizer.

15. A method according to claim 13 including the step of using the product including the sorbent material as a feed supplement.

16. A method according to claim 1 including the step of contacting the slurry with a metal chelating substrate after the step of disintegrating to remove heavy metals therefrom.

17. A method for converting organic cells and other substances in treated sludge into a readily metabolizable product comprising the steps of: adding to the sludge hydrolytic enzymes to hydrolyze the organic cells and other hydrolyzable substances in the sludge; rupturing the hydrolyzed cells after the step of adding to form a colloidal slurry including ruptured organic cell particles and to thereby release into the colloidal slurry endocellular enzymes present in the cells; holding the colloidal slurry for a sufficient length of time so that the hydrolytic enzymes and the endocellular enzymes further hydrolyze organic substances in the slurry and thereby form a readily dewaterable, substantially gel free microparticulate slurry; and thereafter dewatering the microparticulate slurry to form a moist product comprising microparticulate, organic substances.

18. A method according to claim 17 including the step of inhibiting microbial and pathogenic activity in the product during storage and shipment of the product prior to its use.

19. A method according to claim 17 wherein the treated sludge comprises a cellular biomass substantially free of heavy metals, and including the step of using the product as an animal feed supplement.

20. A method according to claim 17 wherein the step of holding the colloidal slurry in a tank is carried out for no more than about 12 hours and maintaining the temperature of the colloidal slurry in the tank at no more than about 40° C.

21. A method according to claim 17 wherein the step of adding comprises the steps of adding to the sludge a substance comprising hydrolytic enzymes, thereafter holding the sludge for up to about two hours, and maintaining the temperature of the sludge during its holding step in the range of between about 16° C. to about 40° C.

22. A method according to claim 17 wherein the step of adding hydrolytic enzymes comprises the steps of adding to the sludge hydrolytic enzyme producing microorganisms.

23. A method for converting treated sludge into a readily metabolizable product comprising the steps of: contacting the sludge with hydrolytic enzymes to hydrolyze organic cells in the sludge and thereby to make them more susceptible to rupture when subjected to mechanical forces by adding to the sludge a substance capable of providing the sludge with hydrolytic enzymes; thereafter rupturing the cells in the sludge to form a colloidal slurry including ruptured organic cell particles, endocellular enzymes and gelled substances released by the cells during their rupture; holding at least one of the sludge, including the enzymes, and the slurry, including the particles; and thereafter separating the slurry into an effluent and a moist product.

24. A method according to claim 23 wherein the step of separating includes the step of dewatering the slurry to form the moist product comprising the ruptured cell particles, and wherein the step of holding the slurry is carried out for up to about 12 hours prior to the step of dewatering to thereby further hydrolyze the particles and gelled substances present in the slurry to facilitate the dewatering step.

25. A method according to claim 24 wherein the step of holding is performed no later than about 20 hours after the step of contacting.

26. A method for converting organic cells and other organic substances in treated sludge into a readily metabolizable product comprising the steps of: adding hydrolytic enzymes or hydrolytic enzyme producing microorganisms to the sludge and holding the sludge including enzymes for a sufficient length of time to hydrolyze the polysaccharide slime coating on the cells, to release into the sludge any heavy metal ions occluded in the coating, and to soften the walls of the cells; rupturing the cells in the sludge to form a colloidal slurry comprising ruptured cell particles, heavy metal ions endocellular enzymes released by the cells during their rupture and a gel; thereafter, autolyzing the colloidal slurry by holding it in a tank for a sufficient length of time to permit enzymes present in the colloidal slurry to hydrolyze the particles and the gel and form a microparticulate slurry including the ruptured cell particles; and thereafter dewatering the microparticulate slurry to form a substantially clear effluent and a moist product comprising the ruptured cell particles previously present in the microparticulate slurry.

27. A method according to claim 26 including the step of removing from the slurry heavy metals present therein by contacting the slurry with a metal chelating substrate.

28. A method for processing treated sludge including organic cells and heavy metals to recover therefrom usable materials comprising the steps of: adding to the sludge hydrolytic enzymes; holding the sludge and the added enzymes for a sufficient length of time to at least partially hydrolyze the walls of the cells and any polysaccharide slime coating present on the cells; thereafter rupturing the cells in the sludge to form a collodial slurry including ruptured cell particles and a gel and to thereby further release into the collodial slurry endocellular enzymes present in the cells; contacting the slurry with a metal chelating substrate to remove heavy metals therefrom; further hydrolyzing organic substances in the colloidal slurry by holding the slurry in a tank for sufficient length of time to hydrolyze the particles and the gel and to thereby form a microparticulate slurry;

dewatering the microparticulate slurry and collecting a moist product; storing the product; preventing decomposition of the product by inhibiting microbial and pathogenic activity in the product being stored; and thereafter using the product as a readily metabolizable substance for living organisms.

29. A method according to claim 28 including the step of holding the slurry in a tank for a length of time which exceeds the length of time for which the sludge is held.

30. A method according to claim 29 wherein the step of preventing decomposition of the product comprises the step of acidifying the product to a pH of between about 3 to about 3.5.

31. A method according to claim 28 including the step of adjusting the pH of the sludge to between about 6.5 to about 7.2.

* * * * *